(12) United States Patent
Little, Jr.

(10) Patent No.: US 10,648,153 B2
(45) Date of Patent: May 12, 2020

(54) TAPE

(71) Applicant: W. Frank Little, Jr., Magnolia, TX (US)

(72) Inventor: W. Frank Little, Jr., Magnolia, TX (US)

( * ) Notice: Subject to any disclaimer, the term of this patent is extended or adjusted under 35 U.S.C. 154(b) by 0 days.

(21) Appl. No.: 15/621,738

(22) Filed: Jun. 13, 2017

(65) Prior Publication Data
US 2018/0155897 A1  Jun. 7, 2018

Related U.S. Application Data

(60) Continuation of application No. 12/834,762, filed on Jul. 12, 2010, now abandoned, which is a division of application No. 11/679,069, filed on Feb. 26, 2007, now abandoned.

(60) Provisional application No. 60/782,358, filed on Mar. 15, 2006, provisional application No. 60/777,188, filed on Feb. 27, 2006.

(51) Int. Cl.
| | |
|---|---|
| *E02D 37/00* | (2006.01) |
| *E04F 13/04* | (2006.01) |
| *D03D 9/00* | (2006.01) |
| *D03D 15/00* | (2006.01) |
| *D03D 3/00* | (2006.01) |
| *C09J 7/21* | (2018.01) |
| *C09J 201/00* | (2006.01) |

(52) U.S. Cl.
CPC ............... *E02D 37/00* (2013.01); *C09J 7/21* (2018.01); *D03D 3/005* (2013.01); *D03D 9/00* (2013.01); *D03D 15/0011* (2013.01); *E04F 13/04* (2013.01); *E04F 13/042* (2013.01); *E04F 13/047* (2013.01); *C09J 201/00* (2013.01); *C09J 2201/128* (2013.01); *Y10T 428/249924* (2015.04); *Y10T 428/28* (2015.01)

(58) Field of Classification Search
USPC .......................................... 442/208–216, 217
See application file for complete search history.

(56) References Cited

U.S. PATENT DOCUMENTS

| | | | |
|---|---|---|---|
| 1,039,363 A | 9/1912 | Chapin | |
| 1,467,127 A | 9/1923 | Walper | |
| 1,751,327 A | 3/1930 | Haire et al. | |
| 2,047,982 A | 7/1936 | Page | |
| 2,064,785 A | 12/1936 | Crandell | |
| 2,313,990 A | 3/1943 | Crandell | |
| 3,109,207 A | 11/1963 | Cooper | |
| 3,305,993 A | 2/1967 | Nelson | |

(Continued)

FOREIGN PATENT DOCUMENTS

| | | |
|---|---|---|
| DE | 7306581 U | 6/1973 |
| DE | 19525689 C1 | 11/1996 |
| FR | 2123259 A1 | 9/1972 |

OTHER PUBLICATIONS

Canadian Office Action dated May 1, 2015, for Canadian Patent Application No. 2,754,647.

(Continued)

*Primary Examiner* — Frank D Ducheneaux
(74) *Attorney, Agent, or Firm* — Patterson + Sheridan, LLP

(57) ABSTRACT

A dry wall tape for use with a panel system includes a mesh having a plurality of width strands, and a plurality of length strands which traverse the plurality of width strands, wherein the length strands are more resistant to a pulling force than the width strands and wherein the tape is configured to be applied to the panel system.

24 Claims, 8 Drawing Sheets

(56) References Cited

U.S. PATENT DOCUMENTS

| | | |
|---|---|---|
| 3,391,037 A | 7/1968 | McNulty |
| 3,488,904 A | 1/1970 | Schneller et al. |
| 3,576,091 A | 4/1971 | Shull, Jr. et al. |
| 3,579,409 A | 5/1971 | Shannon |
| 3,778,939 A | 12/1973 | Nelsson |
| 3,810,340 A | 5/1974 | Nelsson |
| 3,852,935 A | 12/1974 | Jones |
| 3,859,765 A | 1/1975 | Nelsson |
| 3,986,312 A | 10/1976 | Calhoun et al. |
| 4,042,739 A | 8/1977 | Emal et al. |
| 4,069,639 A | 1/1978 | Lindner et al. |
| 4,069,640 A | 1/1978 | Dawdy |
| 4,157,271 A | 6/1979 | Moore |
| 4,267,228 A | 5/1981 | Stone et al. |
| 4,313,991 A | 2/1982 | Lamb |
| 4,425,175 A | 1/1984 | Moore |
| 4,724,183 A | 2/1988 | Heiman |
| 4,792,473 A | 12/1988 | Vitale |
| 4,934,119 A | 6/1990 | Ybarra |
| 5,060,434 A | 10/1991 | Allison |
| 5,087,310 A | 2/1992 | Robinette |
| 5,162,150 A | 11/1992 | Buis et al. |
| 5,216,859 A | 6/1993 | Moreno et al. |
| 5,246,775 A | 9/1993 | Loscuito |
| 5,283,091 A | 2/1994 | Darvell et al. |
| 5,333,433 A | 8/1994 | Porambo et al. |
| 5,390,458 A | 2/1995 | Menchetti |
| 5,442,886 A | 8/1995 | Iacobelli |
| 5,486,394 A | 1/1996 | Stough |
| 5,487,250 A | 1/1996 | Yount et al. |
| 5,604,001 A | 2/1997 | Schold |
| 5,628,159 A | 5/1997 | Younts |
| 5,651,225 A | 7/1997 | Leeks |
| 5,687,523 A | 11/1997 | Stough |
| 5,711,124 A | 1/1998 | Stough et al. |
| 5,729,945 A | 3/1998 | Menchetti et al. |
| 5,843,542 A | 12/1998 | Brushafer et al. |
| 5,891,282 A | 4/1999 | Stough et al. |
| 5,895,301 A | 4/1999 | Porter et al. |
| 5,924,256 A | 7/1999 | Ito |
| 6,165,304 A | 12/2000 | Otruba |
| 6,176,054 B1 | 1/2001 | Allen et al. |
| 6,231,962 B1 | 5/2001 | Bries et al. |
| 6,302,375 B1 | 10/2001 | Heil et al. |
| 6,413,606 B1 | 7/2002 | Calderon |
| 6,576,048 B1 | 6/2003 | Burdick et al. |
| 7,141,284 B2 | 11/2006 | Newton et al. |
| 7,197,853 B1 | 4/2007 | Little, Jr. |
| 7,451,577 B2 | 11/2008 | Little, Jr. |
| 2003/0181114 A1 | 9/2003 | Newton et al. |
| 2005/0051278 A1 | 3/2005 | Dobson |
| 2006/0061278 A1 | 3/2006 | Jung et al. |
| 2006/0207202 A1 | 9/2006 | Newton et al. |

OTHER PUBLICATIONS

EP Search Report for Application No. 07757516.5 dated Apr. 8, 2010.
PCT Search Report for Application No. PCT/US 07/62845 dated Dec. 16, 2008.
U.S. Prosecution History for U.S. Appl. No. 09/652,648.
U.S. Prosecution History for U.S. Appl. No. 11/533,253.
U.S. Prosecution History for U.S. Appl. No. 12/271,720.
U.S. Prosecution History for U.S. Appl. No. 12/271,706.
U.S. Prosecution History for U.S. Appl. No. 11/679,069.
Canadian Office Action for Application No. 2,643,293 dated Apr. 16, 2010.

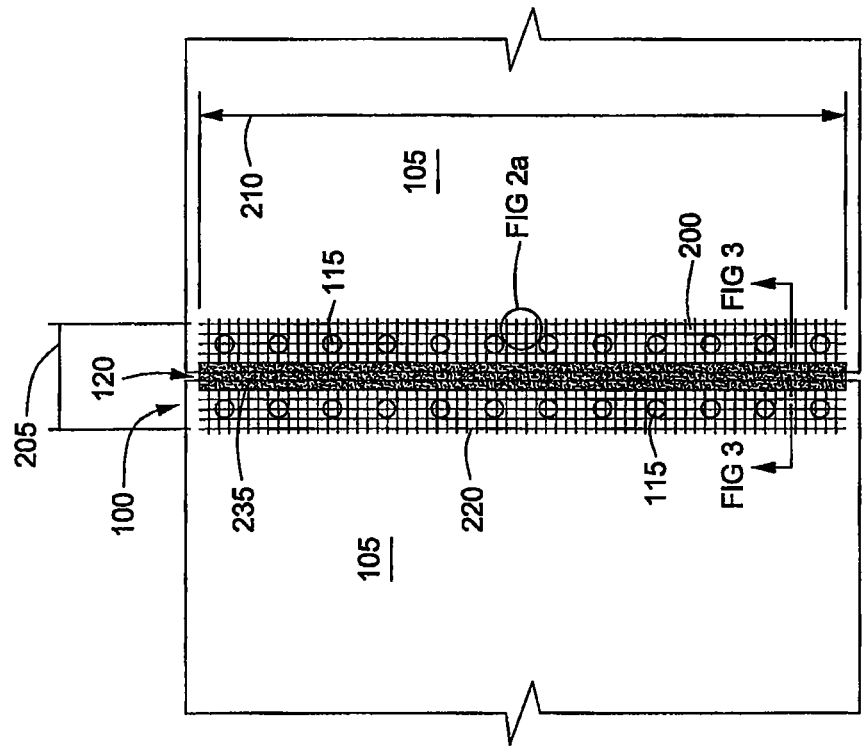
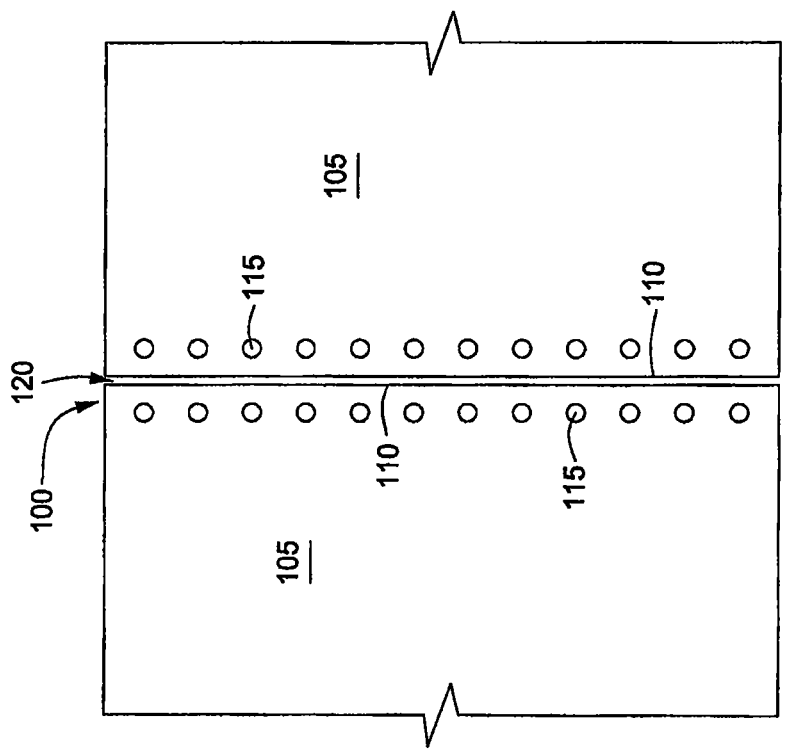

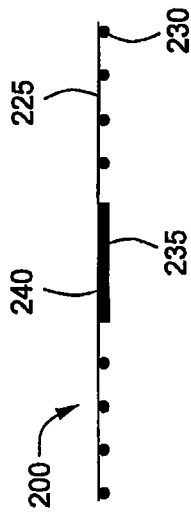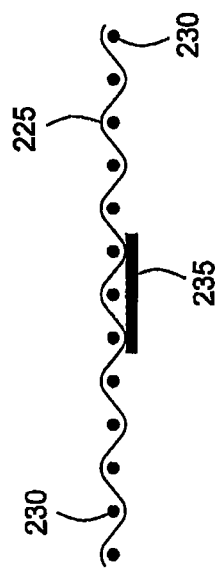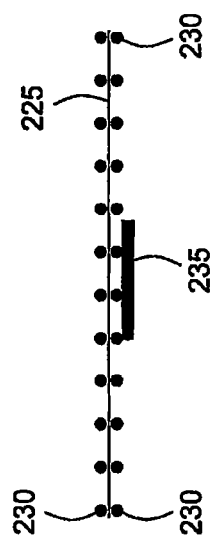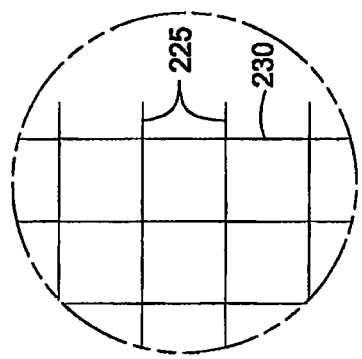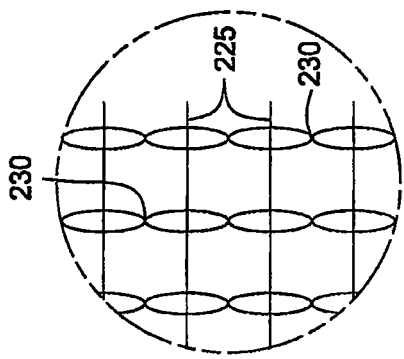

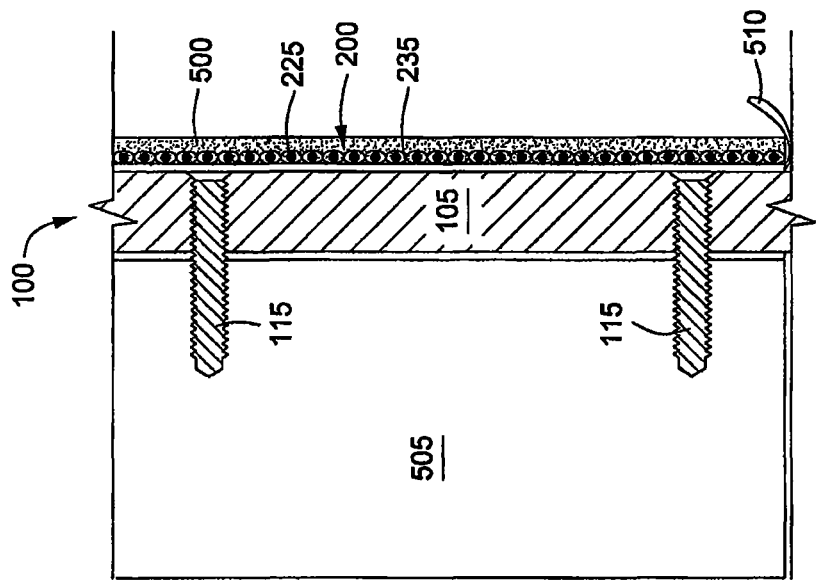
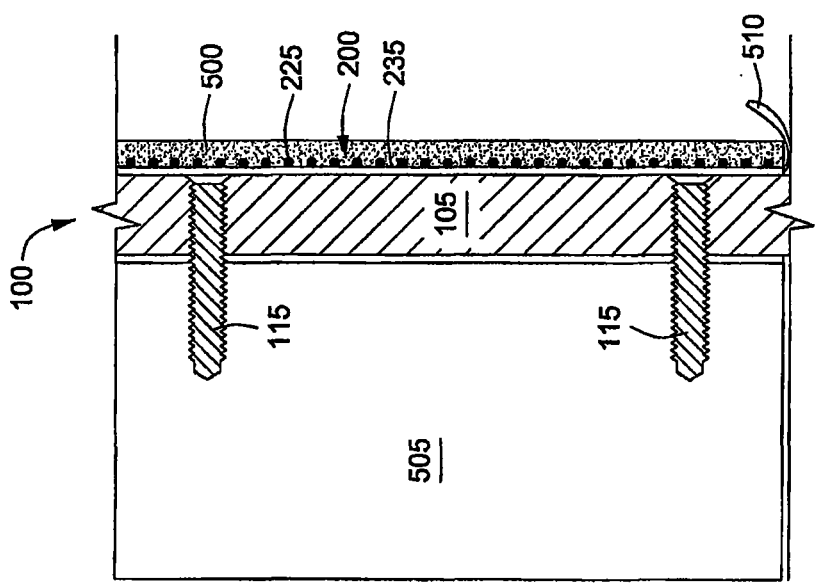

TAPE

CROSS-REFERENCE TO RELATED APPLICATIONS

This application is a continuation of co-pending U.S. patent application Ser. No. 12/834,762, filed Jul. 12, 2010; which claims benefit of U.S. patent application Ser. No. 11/679,069, filed Feb. 26, 2007; which application claims benefit of U.S. provisional patent application Ser. No. 60/782,358, filed Mar. 15, 2006, and U.S. provisional patent application Ser. No. 60/777,188, filed Feb. 27, 2006, all of which are herein incorporated in their entirety.

BACKGROUND OF THE INVENTION

Field of the Invention

Embodiments of the present invention generally relate to an apparatus and method for taping a surface and removing the tape. Particularly, the present invention relates to an apparatus and method for securing and removing tape from panel surfaces. More particularly still, the present invention relates to an apparatus and method for taping a panel joint and or taping panel fasteners; and then removing the tape and fasteners during disassembly of the panels.

Description of the Related Art

In the erection of panels for use in homes, facilities and buildings, surface panels are often secured to support elements such as studs. The surface panels are typically prefabricated panels that vary in size. A common panel is four feet wide by eight feet in length. These panels are fastened to the support element in a manner that creates a substantially planar surface having joints at some of the panel edges. In order to finish the panel and create a smooth surface, it is often necessary to apply a tape over the joint and/or apply a tape over the fasteners and then cover the tape and fasteners with a compound such as mud. Once dry, the compound is often smoothed to a seamless surface. The panel is then ready for a finish such as paint.

The most commonly used panel is gypsum board sheathing, which is also known as gypsum board, panelboard, plasterboard, gypboard, GYPROC®, SHEETROCK®, and rock. Gypsum board sheathing is composed of a sheet of gypsum covered on both sides with a paper facing. Gypsum is calcium sulfate dehydrate ($CaSO_4.2H_2O$). The removal and disposal of gypsum board sheathing and other panels is becoming an increased environmental problem. Hydrogen sulfide gas may be produced when gypsum is placed in a landfill, particularly in a wet climate. Hydrogen sulfide gas is toxic, even lethal to humans, and is detected by a foul, rotten-egg odor. The environmental concerns associated with gypsum board sheathing disposal have led several communities to ban gypsum board sheathing at landfills. Thus, the disposal of gypsum board sheathing, once removed, has become a problem. Further, with increased depletion of our natural resources, the increased demand on landfills, and the awareness of recycling; it is advantageous to reuse existing building materials. There is also a cost savings in reusing the existing materials. Reuse by way of relocation is far better than reuse by way of recycling because of the dramatic reduction in use of our natural resources due to the reduction in landfill needs, toxic waste, transportation to and from the factory and energy used during remanufacturing. Gypsum board accounts for 26% of the construction landfill waste (in Houston) and is the only survey listed element that is toxic and is the only one that currently has zero recycling and zero reuse score in the survey. Building construction accounts for 40% of our national energy consumption. Reducing this (along with auto energy consumption which is 40%) by over half is realistic and together they could eliminate our dependence on foreign energy.

In an attempt to solve the problem of gypsum board sheathing disposal, some companies have started to recycle gypsum board sheathing. The removed gypsum board sheathing is taken to the recycling center and a portion of the gypsum is removed and combined with virgin gypsum to make new gypsum board sheathing. Currently, however, only 20-30% of the gypsum may be recovered from the used gypsum board sheathing. Further, the recycling of the gypsum board sheathing creates added cost in transporting it to a recycle center. Another barrier, in gypsum recycling, is economically separating the gypsum board panels from the support elements and other construction waste during the demolition process. Further, toxic mold is a major problem facing homes, apartments, hotels, and hospitals due to water overflow from fixture overflow and roof/envelope leaks. The water travels into the dark cavities behind and between panels and becomes trapped, thus creating a perfect breeding place for toxic molds. Removal of the panels allow the cavity behind panels to dry out and wet insulation to be easily removed. Once dry, the panels are reinstalled.

The problem with taped joints in gypsum board sheathing or other panels is that the removal of the panel is difficult without destroying the panel. In order to remove the panel without destroying the panel, it is necessary to access the fasteners. The tape is provided on top of the fasteners but under the compound. The compound used to finish the joint is typically very durable and cures into a hard cement like substance over time. Curing continues for many years after it is dry enough to receive paint or other covering. Thus, accessing and removing the tape to access the fasteners is difficult. Current gypsum board sheathing tapes on the market are not designed for removal and thus will routinely break when pulled once the compound has cured near maximum strength. Currently the American Society of Testing and Materials ASTM, requires a performance for the width dimension of the tape; however, it does not regulate the performance of the length of the tape. Because ASTM does not regulate the performance or tensile strength of tape in the length direction, typical tapes have been made with minimal tensile strength in the length direction as the function of the length strands in joint tape is merely to carry or host the width strands. The weaker length strands save materials during manufacturing and thereby reduce the overall cost of the tape. Thus, some dry wall tapes on the market today have a weaker length dimension than width dimension.

Therefore, there is a need for an efficient and economical apparatus and method for removing paneling for reuse in construction. There is a further need for a tape that is removeable once compound is applied and cured. There is a further need for the tape to withstand the stresses unique to its removal in order to prevent breaking during removal.

SUMMARY OF THE INVENTION

The present disclosure generally relates to a strip of tape having a width dimension and a longer length dimension. The tape has a greater resistance to a pulling force than a cured compound. The tape may be more resistant to a pulling force along the length than the width.

The present disclosure further relates to a method of removing a tape from a surface by applying the tape to the surface typically in one continuous length. Pulling the tape along the reinforced length dimension. Removing the tape without breaking the tape. The tape has a reinforced length dimension.

BRIEF DESCRIPTION OF THE DRAWINGS

So that the manner in which the above recited features of the present invention may be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a front view of a panel joint, according to an embodiment of the present invention.

FIG. 2 is a front view of a panel joint with a tape, according to an embodiment of the present invention.

FIG. 2A is a front view of a tape mesh, according to an embodiment of the present invention.

FIG. 2B is a front view of a tape mesh, according to an alternative embodiment of the present invention.

FIG. 3 is a cross-sectional view of a tape mesh, according to an embodiment of the present invention.

FIG. 3A is a cross-sectional view of a tape mesh, according to an alternative embodiment of the present invention.

FIG. 3B is a cross-sectional view of a tape mesh, according to an alternative embodiment of the present invention.

FIG. 5 is a partial cross-sectional side view of a completed panel joint, according to an embodiment of the present invention.

FIG. 5A is a partial cross-sectional side view of a completed panel joint, according to an alternative embodiment of the present invention.

DETAILED DESCRIPTION

Figure 4:
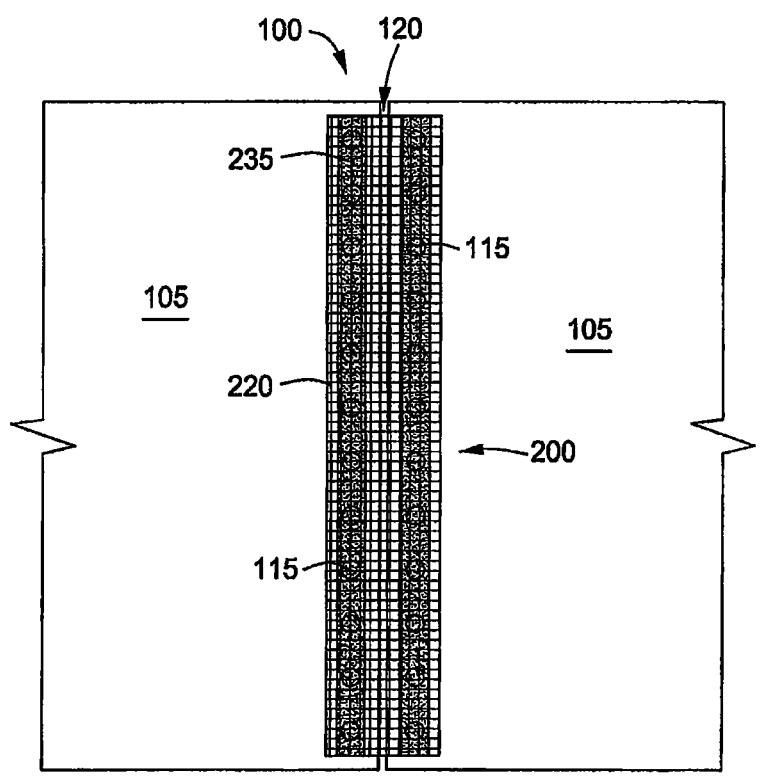
FIG. 4 is a front view of a panel joint with a tape, according to an embodiment of the present invention.

FIG. 1 is a front view of a portion of a panel joint 100. The panel joint 100, as shown, has two panels 105 which are adjacent at edges 110. The panels 105 connect to a support element, not shown, with fasteners 115. The support element may be any element for supporting the panels 105 including, but not limited to, wood studs, metal studs, concrete blocks, or furring channels. The fasteners 115 may be any fastener including, but not limited to, screws, or nails, or an adhesive. In one embodiment, the panels 105 are gypsum board sheathing panels. Although it should be appreciated that any paneling may be used. With the panels 105 attached to the support element, a small gap 120 or discontinuity exists between the panels 105. In order to finish the panel surface, a tape and a compound are applied to the panel joint 100. The compound cures into a hardened material which covers the tape and the joint. The compound is then smoothed into a continuous surface as will be described in more detail below. The tape or tape system provided has a tensile strength along the length of the cured compound 500. The compound will cure to a near maximum strength over time. The near maximum strength is herein referred to as "cured" as opposed to "sufficiently cured." Sufficiently cured is a point beyond that required to cover, sand, paint and bond the panel joint but less than near maximum strength. Depending on the composition of the compound and humidity conditions, the compound may be sufficiently curing for up to two years. The tensile strength of the tape is greater than the tensile strength of the adhesion strength of the cured compound. A sufficiently cured compound is hard enough to be sanded and painted. Further, a sufficiently cured compound bonds the panel joints together. The compound continues to hardened until it becomes a cured compound. Further, as time goes on the compound will continue to cure to have an even higher resistance to a pulling force on the tape. As herein defined the adhesion strength of the compound refers to the tensile strength of the compound, the shear strength of the compound, the tensile strength of the bond between the compound and the panel, or any combination thereof. The tape disclosed herein may be removed at any point during the curing of the compound, including many years into the future. Therefore, the tape may be removed from the panel surface after the compound has cured. When the tape is removed, the compound is removed as well thereby exposing the fasteners as will be described in more detail below.

FIG. 2 depicts the panel joint 100 having a strip of tape 200 applied to the joint, according to one embodiment of the invention. The tape 200 has a width dimension 205 that is sufficient to cover the gap 120 and the fasteners 115. In one embodiment, the width dimension is 2"; however, it should be appreciated that any dimension may be used as long as it covers the gap 120. As shown, the tape 200 has a length dimension 210 that is sufficient to cover substantially the entire length of the panel joint 100. Although shown as covering substantially the entire length of the panel joint 100, it should be appreciated that the tape 200 may have any length dimension 210.

The tape 200, according to one embodiment, comprises a mesh 220. It should be appreciated; however, that the tape may be a paper tape. The paper tape may have holes punched in it to simulate the performance of a mesh tape. The mesh 220 has of a plurality of width strands 225, which substantially traverse the width 205 of the tape 200 and a plurality of length strands 230 which substantially traverse the length 210 of the tape 200, as shown in FIG. 2A. The length strands typically run substantially parallel with the panel edge and the width strands typically run substantially perpendicular to the panel edge. The width strands and length strands are couple together by a glue, however, it should be appreciated that the strands may be coupled by any method known in the art including but not limited to interwoven together, crimped, glued, tied, chemically bonded, leno woven, weft inserted warp knitted, or melted. However, it should be appreciated that the strands may run at a diagonal to the panel edge. The width strands 225 may be referred to as the Weft, pick, and fill. These terms encompass strands that are substantially perpendicular to the joint 100. The length strands 230 may be referred to as the Warp. This term encompasses strands that are substantially parallel to the joint 100.

FIG. 2B shows an alternative embodiment wherein each of the length strands 230 have a plurality of strands. The strands may be combined to one another by any method including, but not limited to, interwoven together, leno woven, weft inserted warp knitted, crimped, glued, tied, chemically bonded or melted. The plurality of strands increases the tensile strength of the length strands.

The strands are made from fiberglass or fiberglass multifilament strands. Although it should be appreciated that any material for making a tape may be used including but not limited to fiberglass yarns, paper, polymers, nylon, pvc, hemp, or cotton. One advantage of the fiberglass strand is that it resists mold and will not absorb moisture. Typical mesh tapes on the market today have an equal size width and length strand; however, at least one tape has a reinforced width strand when compared to the length. The latter type enables the tape to reinforce the panel joint 100 while saving material by supplying a weaker length strand. Typical width and length strands on the market today have a tensile strength of 75 LBS/inch. At least one manufacturer produces a tape having a length strand having a lower yield stress in order to save money during manufacturing. In this instance the length stand has a tensile strength of 50 LBS/inch while the width strands have a tensile strength of 105 LBS/inch. The length strands on the market today simply provide support for the width strands.

As shown in FIG. 2, the mesh 220, in one embodiment, includes a pull-strip 235 that is substantially the same length as the tape 200. The pull-strip 235, as shown is a reinforced strand which has an increased width for providing increased strength against a pulling force in the longitudinal direction. The pull-strip 235, as shown, is made from the same material as the mesh 220. However, it should be appreciated that any material that has substantial resistance to longitudinal forces including, but not limited to, cloth, metals, polymers may be used. The pull-strip 235 is manufactured integrally with the mesh 220 as shown in one embodiment.

A cross sectional view of the tape 200, shown in FIG. 3, which depicts the length strands 230 running substantially parallel to the pull-strip 235. The width strands 225 attach to a top 240 of the length strands 230 and the pull-strip 235. In this embodiment, the pull-strip 235 is provided under the width strands 225 in order to ensure that when a pulling force is applied to the pull-strip 235, the pull-strip 235 is removed with the width strands. Although shown as the width strands 225 being on top of the length strands 230, it should be appreciated that the strands 225 and 230 may be in any configuration, including interwoven, as shown in FIG. 3A, or the length strands 230 on top of the width strands 225, or the length strands 230 and width strands 225 may be in a diagonal relationship to the tape, or in any other configuration, so long as the pull-strip 235 removes the width strands 225. Further, the tape may include a plurality of strands for each length strand as shown in FIG. 3B.

As shown in FIG. 2, the pull-strip 235 is a strip substantially in the middle of the width dimension 205 of the tape 200. It should be appreciated, however, that the pull-strip 235 may be located at any location in the width dimension 205 so long as the pull-strip 235 runs in the length dimension. In an alternative embodiment, more than one pull-strip 235 may be used for each tape 200, as shown in FIG. 4. The two or more pull-strips 235 may be arranged in any configuration so long as the pull-strips 235 are adapted to remove the tape 200 from the panels 105. Increasing the number of pull-strips 235 in the tape 200 will increase the amount of pulling force that may be applied to the tape 200.

Once the tape 200 is attached to the joint 100, a compound 500 is applied to the joint 100 in order to cover the tape 200, the fasteners 115, and the joint 100, as shown in a cross sectional side view of the joint 100 in FIG. 5. FIG. 5 shows the panel 105 attached to a support element 505 with the fasteners 115. FIG. 5A shows the panel 105 as in FIG. 5 having a tape 200 wherein each of the length strands includes the plurality of strands. The tape 200 has been applied to the joint 100 in an arrangement that covers the fasteners 115. An optional handle 510, for gripping and removing the tape 200, may be included in the tape 200. The handle 510 may be only the pull-strip 235 or the entire tape 200 extending from the panel 105, or any feature that allows access to the pull-strip 235 and/or the tape 200. Further, the handle may be at any location in the joint 100 so long as it is accessible for removing the tape 200. With the tape 200 in place on the joint 100, the compound 500 is applied. The compound 500 is typically mud, but it should be appreciated that it may be any joint compound including, but not limited to, an aqueous cementitious adhesive, caulking, epoxy, silicon, vinyl, a yucca based adhesive. As the compound 500 is applied to the joint 100, the compound 500 fills in and encompasses any spaces in the mesh 220 while covering the joint 100. With the compound 500 covering the joint 100, it is smoothed into a substantially planar surface. The handle 510 may optionally be covered by trim, not shown, such as baseboards, crown molding, or any trim appropriate for the location of the handle 510. Further, the handle 510 may be covered by flooring, such as carpet, wood floors, laminates, tile, etc, or covered by the ceiling covering, such as ceiling tiles, or panels.

With the joint 100 complete, the panel may be finished by any method including, but not limited to, painting, texturizing, wallpapering, covering with fabric, wood, plastic, plastic laminate, or linoleum. The panel then remains in place until the panel is going to be demolished or demounted. Once the panel is ready for removal, the trim covering the handle 510 is removed for access to the handle. The handle 510 is gripped and pulled. As the handle 510 is pulled, the pull-strip 235, and/or the tape 200, removes the tape 200 with the compound 500 on top of it and/or within the mesh 220. The pull-strip 235 is of sufficient strength to remove the cured compound 500 without routinely breaking the tape 200. With the tape 200 and the compound 500 removed from the joint 100, the fasteners 115 are accessible. The fasteners 115 may then be taken out. This procedure is repeated for each joint 100. With all of the fasteners 115, removed the panel 105 may be taken off the support elements and used in the construction elsewhere or separated from other construction waste, during demolition or demounting, in order to comply with toxic waste land fill regulations.

Although described in the context of a vertical panel assembly, it should be appreciated that the joint 100 may be on a roof panel, ceiling panel, insulation panel, floor panel, or any other surface that is covered with panels 105. Further, the same tape may be used in substantially the same way to cover fasteners 115 located away from a joint 100. Further, a handle 510 may be accessed simply by cutting into the joint 100 and accessing the pull-strip 235 and/or the tape 200.

In yet another embodiment, the compound may be applied to allow a portion of the tape 200 to be exposed while the tape is on the panel. That is, a portion of the tape is exposed on the panel after the compound has been applied. Thus, the completed panel has a portion of the tape 200 that is exposed after the compound has substantially cured. This exposed portion may be covered by a trim. Upon removal, the exposed portion is gripped and pulled thereby removing the compound covering the tape 200.

The tape 200 may have an adhesive applied to it in order to initially apply it to the panel. The adhesive may be applied to only the bottom side of the tape or it may be applied to both sides. Further, the adhesive may be applied to the pull strip 235. The adhesive may be any adhesive including, but not limited to, an acrylic adhesive, rubber, a polymer.

Figure 6:
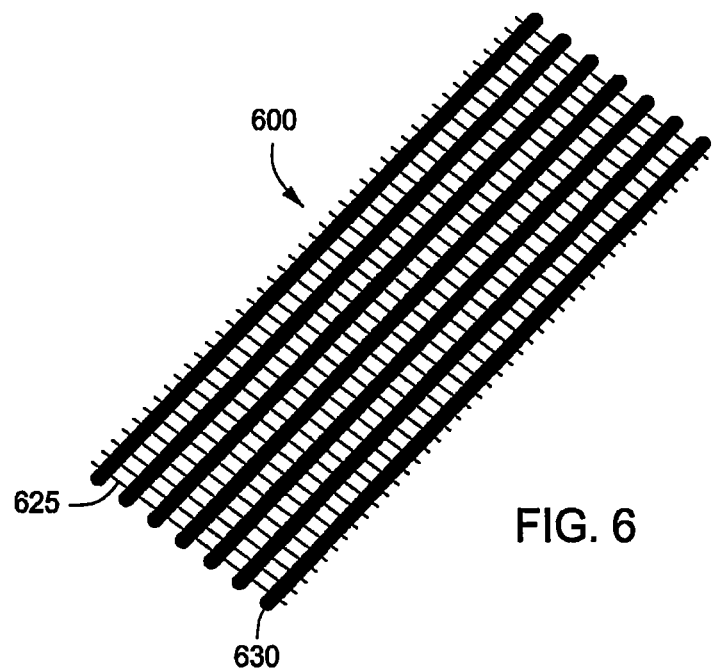
FIG. 6 is a perspective view of a tape, according to an embodiment of the present invention.
Figure 6A:
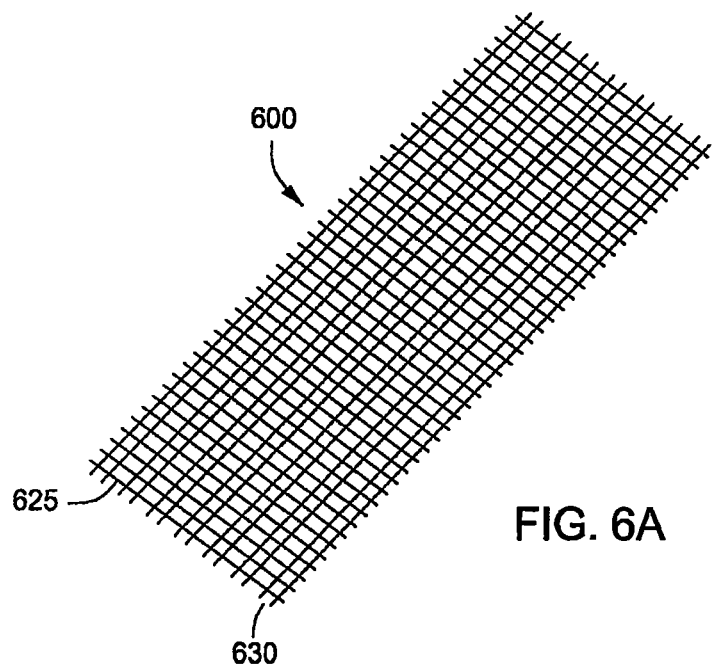
FIG. 6A is a perspective view of a tape, according to an embodiment of the present invention.

In an alternative embodiment the length strands may be the pull-strip and/or be integral therewith. FIGS. 6 and 6A depict an alternative embodiment of the tape 600, wherein the length strands act as the pull strip. In this embodiment, the tape 600 has increased strength length strands 630. The length strands 630 may have an increased cross-sectional area when compared to the width strands 625, as shown in FIG. 6. This increase in cross-sectional area provides for increase pull force resistance. Thus, this tape 600 is used in the same way as describe above but without needing the pull-strip 235. Although shown without a pull-strip 235, it should be appreciated that a pull-strip may be incorporated in conjunction with the embodiment in FIG. 6 in order to increase the resistance to a pulling force. Further, it should be appreciated that both the length strand 630 and the width strand 625 may be of the same cross-sectional area or substantially the same cross-sectional area, as shown in FIG. 6A, as long as the length strands 630 have sufficient strength to remove the tape 600 in a steady pull, without routinely breaking. Further, in another embodiment length strands 630 have an increased strength, yield strength and/or ultimate strength. The increased strength is due to material or configuration changes.

Traditionally the length strands 230, of drywall joint tapes, were simply for supporting the width strands 225 and therefore had low tensile strength. In an alternative embodiment, the tensile strength of the length strands 630 is greater than 75 LBS/inch, which is greater than the tensile strength of the length strand of current tapes on the market. In yet another embodiment, the tensile strength of the length strands 630 is greater than 110 LBS/inch. In yet another, embodiment, the tensile strength of the length strands 630 is greater than 200 LBS/inch. In yet another alternative, the tensile strength strands 630 is greater than 230 LBS/inch.

Figure 7:
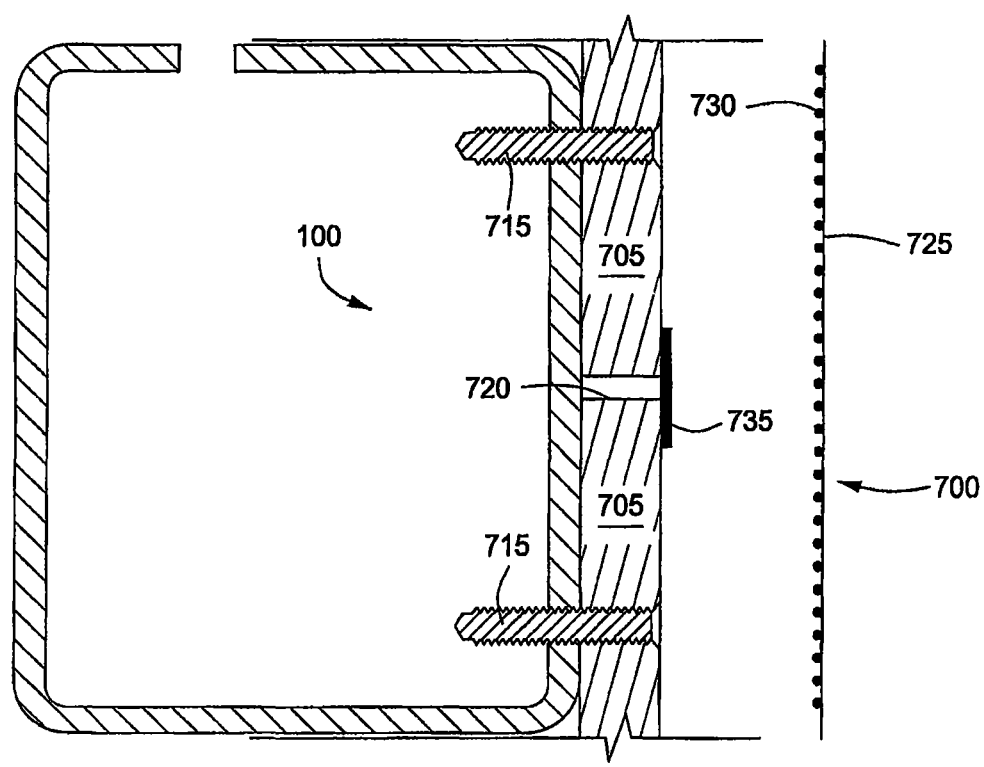
FIG. 7 is a partial cross-sectional side view of a panel joint, according to an embodiment of the present invention.
Figure 7A:
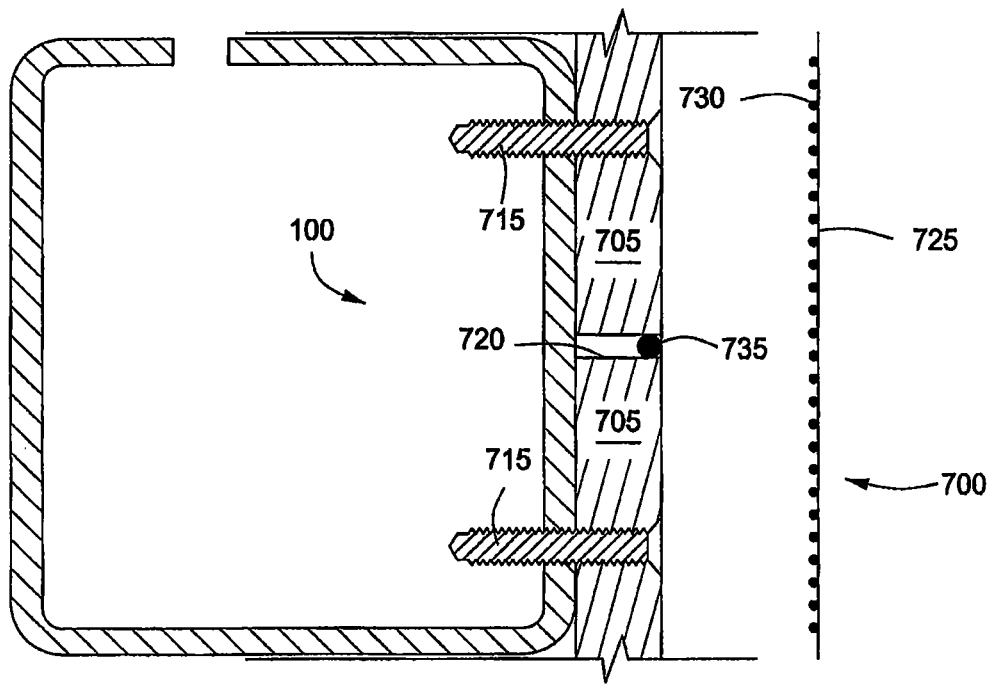
FIG. 7A is a partial cross-sectional side view of a panel joint, according to an embodiment of the present invention.

In yet another embodiment shown in FIG. 7, a separate pull-strip 735 is used. The separate pull-strip 735 is configured in the same way as describe above; however, it is not manufactured as an integral part of strip of tape 700, which includes width strands 725 and length strands 730. The separate pull-strip 735 is applied to the joint 100, then covered by the tape 700. The separate pull-strip 735 may be placed at any location on the joint 100, such as over the gap 720 between panels 705, or in the gap 720 as shown in FIG. 7A, or over a fastener 715, or any other configuration. Further, more than one separate pull-strip 735 may be used to increase the pull force that may be applied, and/or cover multiple rows of fasteners. The separate pull-strip 735, may be used in conjunction with conventional gypsum board sheathing tapes or with any tape described herein. With the tape 700 covering the separate pull-strip 735, the joint 100 is completed and removed in the same way as described above.

Figure 7B:
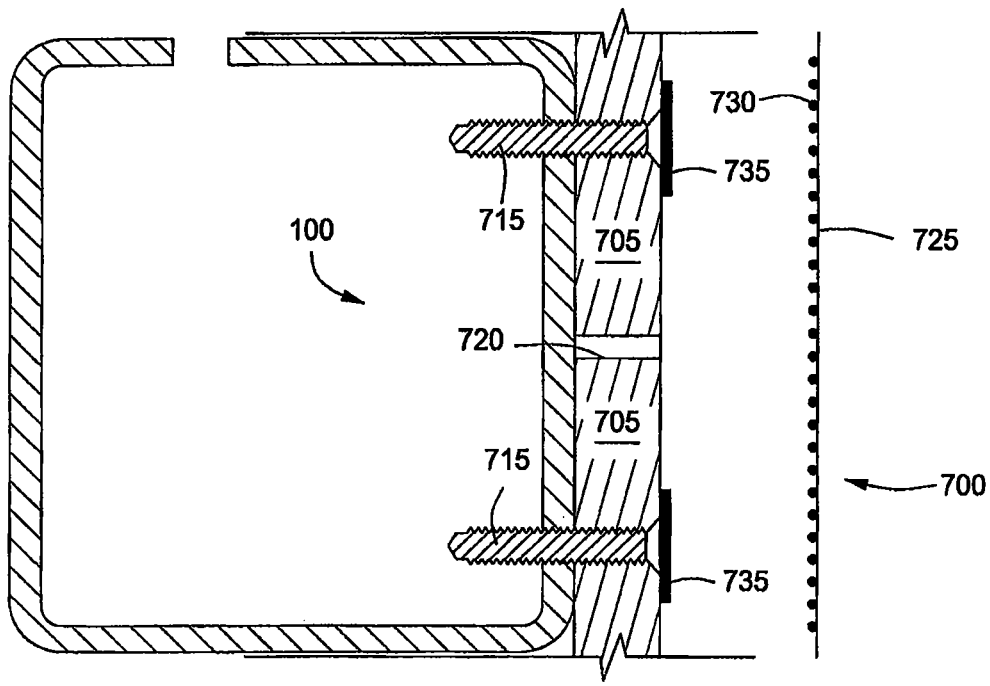
FIG. 7B is a partial cross-sectional side view of a panel joint, according to an embodiment of the present invention.

In yet another alternative embodiment, the pull-strips 235/735 are adapted to cover the fasteners 115/715, as shown in FIG. 7B. With the pull-strips 235 covering the fasteners, the need for the width strand 225 to be on top of the pull-strip 235 is alleviated, due to the pull-strip protecting the fasteners from the compound.

Figure 8:
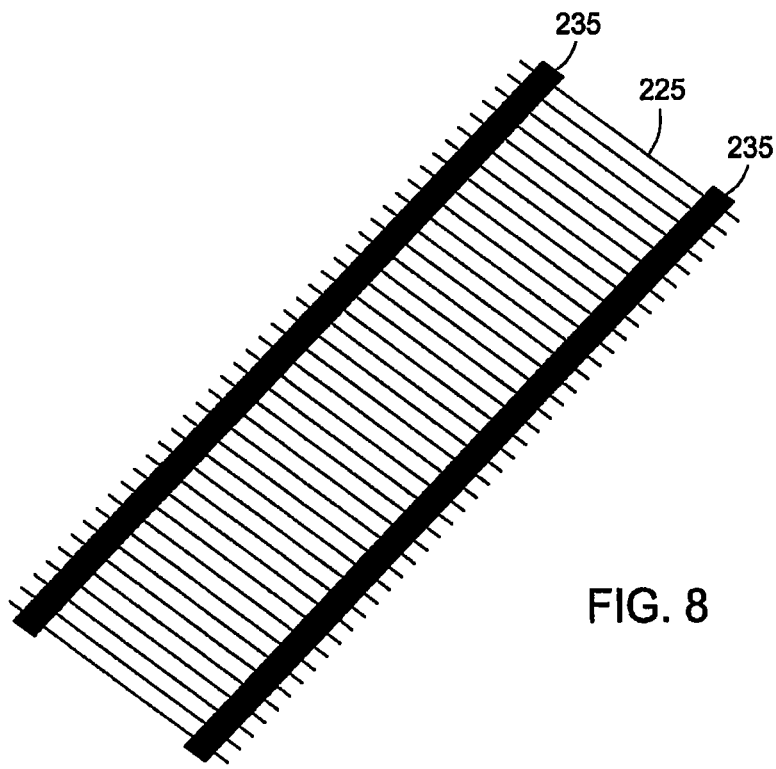
FIG. 8 is a perspective view of a tape, according to an embodiment of the present invention.

In yet another embodiment, one or more pull-strips 235 may be used in conjunction with the width strands 225, and a reduced number of length strands 230 or no length strands 230 may be used, as shown in FIG. 8. The number of length strands 230 may be limited or eliminated because traditionally the length strands 230 were simply for supporting the width strands 225. Thus, with the pull-strips 235 supporting the width strands 225, the need for the length strands 230 is alleviated.

In an alternative embodiment, the pull-strip 235/735 is used in conjunction with any tape, known in the art for gypsum board sheathing joints. Further, the pull-strips 735 may be used without tape at all, but only the compound.

The one or more pull-strips 235/735 described above may be any configuration known in the art such as a ribbon, a string, a strand, fishing line, wire, etc.

In an alternative embodiment, not shown, the one or more pull-strips 235/735 are configured to run the length of the tape in a substantially non linear manner. For example, the one or more pull-strips 235/735 may have a zigzag configuration as they extend on the length of the tape, or a wave configuration, etc.

In yet another alternative embodiment, any or the mesh tapes described above include a plurality of diagonal reinforcing strips, or pull strips. In this embodiment, the diagonally reinforcing strips traverse the width of the mesh tape at an angle to the length strands of the tape. Due to the diagonal arrangement of the reinforcing strips, the reinforcing strips do not extend the entire length of the length strands. The reinforcing strips may be located along the entire length of the length strands in the same manner as the width strands. Further, a second set of reinforcing strips may be placed above or below the reinforcing strips, thereby giving the reinforcing strips a criss-cross design in a diagonal relationship to the mesh of the tape. The reinforcing strips increase the overall strength of the tape by adding structural support to both the width and length strands of the mesh tape. The reinforcing strips may have any configuration so long as they increase the mesh tapes resistance to a pulling force in the length direction.

Figure 9:
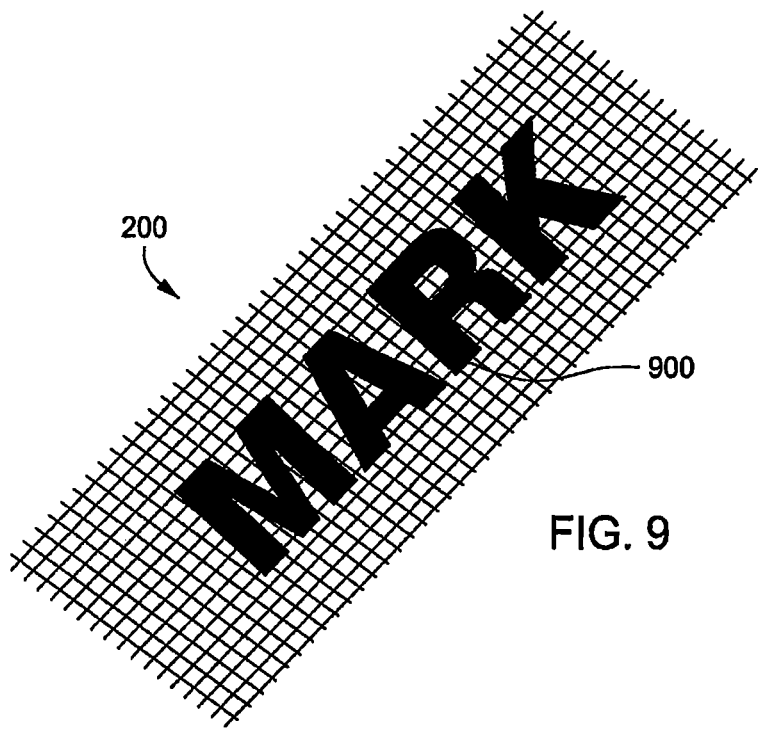
FIG. 9 is a perspective view of a tape, according to an embodiment of the present invention.

In some embodiments described above, it is necessary to apply a top side of the tape 200 away from the panel surface. Due to the arrangement of the pull-strip 235 or the length strands 230/630, it is necessary in some embodiments that they be situated on the panel side of the width strands 225. Due to the small size of the width strands 225, the length strands 230/630, and the pull-strip 235, it is difficult to see which side needs to be up. Thus, a mark 900 may be placed on the up side of the tape 200, as shown in FIG. 9. The mark 900 may be anything that is quickly and easily identifiable to a user of the tape 200 including, but not limited to, a color on the top side, the manufactures trademark, a product name, an advertisement, or a symbol. The mark 900 may be painted or applied on the top side during manufacturing. In yet another alternative, the mark 900 is used to identify removable tape as described. Thus, a user who is removing a panel from a building would see the removable tape, as opposed to traditional tapes, and know that the tape may be removed, thus allowing him to access the fasteners.

In yet another alternative, the tape 200 is placed on the panel joint 100. A second strip of tape, not shown, is then placed substantially over the tape 200 creating a panel joint covered by two strips of tape. The panel joint 100 is then finished as described above. When removing the two strips of tape, the strips are pulled in conjunction with one another thereby increasing the tape's resistance to breaking. In this embodiment any known tape may be used. Further, additional layers of tape may be added.

Typically the openings in the mesh must be small enough to keep sufficient amounts of compound out of the head of the fasteners so that the fasteners may be easily accessed for removal. In addition, the openings in the mesh must be large enough to allow sufficient amounts of compound into the joint between the panels.

In yet another embodiment, fasteners having pull thru or snap off heads may be used on the panels. The pull through heads would be fasteners with heads near the same size as the fastener itself. Thus, when pulling the panel off of the support structure, the fastener heads will easily pull through the panel without damaging the panel. The pull thru head fasteners may be used at any location on the panels. The panels may be wedged from the support elements using any known method such as using a crowbar type tool, or by hand, etc. Further, the space in between the support structure and the panel may be accessed and the fastener may then be cut.

In another embodiment the fasteners may be found using a mechanical, magnetic or electromagnetic device. Thus, the fasteners may be located before the compound or tape was removed. One example of a mechanical method would be shaking or vibrating the panel in order to expose the fastener. With the fasteners located, they may be easily removed from the wall either before or after removing the tape.

In yet another alternative, with the screws removed from the panel edges, the entire panel may be moved by twisting, pulling, etc. in order to locate the remaining fastener or fasteners in the panel. With the last of the fasteners located, they may be easily removed from the wall either before or after removing the tape.

In all of the embodiments discussed above, the cured compound may be moistened before or during, and/or when pulling the tape 200 covered by the compound, the removal process. This pulling of the tape may be performed at an angle of less than 155 degrees from the plane of the panel. This would facilitate the removal of the panels.

In another embodiment, the support element need not be close to the panel edges. Further, in some cases the panel is not fastened to the vertical support elements. In addition, a cushion may be used between the panel and the support elements to reduce vibration due to atmosphere changes in pressure and the like. The cushion may be any material such as painter's caulk. Further, the panel may be fastened at all but one or more edges.

While the foregoing is directed to embodiments of the present invention, other and further embodiments of the invention may be devised without departing from the basic scope thereof, and the scope thereof is determined by the claims that follow.

The invention claimed is:

1. A dry wall tape for use with a panel system, comprising:
a mesh having:
a plurality of width strands, and
a plurality of length strands which traverse the plurality of width strands, wherein:
the length strands have a tensile strength greater than a tensile strength of the width strands,
the length strands are longer than the width strands,
the tape is configured to be applied over a panel joint between two panels of the panel system and then covered with a compound, and
the tensile strength of the length strands is sufficient for the length strands to not break when the tape is pulled off of the panel joint from underneath the compound that has cured.

2. The dry wall tape of claim 1, wherein at least one length strand has a cross-sectional area larger than one of the width strands.

3. The dry wall tape of claim 1, wherein the mesh includes more length strands per unit area than width strands.

4. The dry wall tape of claim 1, wherein at least one length strand has a tensile strength greater than 90 LBS/inch.

5. The dry wall tape of claim 1, wherein at least one length strand has a tensile strength greater than 120 LBS/inch.

6. The dry wall tape of claim 1, wherein the plurality of length strands are arranged under the plurality of width strands such that the plurality of length strands are closer to a surface to which the dry wall tape is applied.

7. The dry wall tape of claim 1, wherein the plurality of length strands are interwoven with the plurality of width strands.

8. The dry wall tape of claim 1, wherein each of the length strands includes two or more strands interwoven together.

9. The dry wall tape of claim 1, wherein the plurality of length strands are arranged on top of the plurality of width strands such that the plurality of length strands are farther from a surface to which the dry wall tape is applied.

10. The dry wall tape of claim 1, wherein the plurality of length strands comprises fiberglass multi-filamented strands.

11. The dry wall tape of claim 1, further comprising an adhesive applied to at least one side of the tape for securing the tape to a surface.

12. The dry wall tape of claim 11, wherein the dry wall tape includes a top side having a mark to identify the top side.

13. The dry wall tape of claim 12, wherein the mark is a color coating.

14. The dry wall tape of claim 1, further comprising a handle for gripping the tape after installation.

15. The dry wall tape of claim 14, wherein the handle comprises a portion of the mesh extending from a finished surface.

16. The dry wall tape of claim 14, wherein the handle comprises a portion of the tape within a finished surface.

17. The dry wall tape of claim 1, further comprising one or more pull-strips which traverse the length of the tape.

18. The dry wall tape of claim 17, wherein the one or more pull-strips are integral with tape.

19. The dry wall tape of claim 18, wherein the one or more pull-strips increases the tensile strength of the plurality of length strands.

20. The dry wall tape of claim 1, wherein at least two adjacent length strands have a cross-sectional area that is larger than one of the width strands.

21. A dry wall tape for use with a panel system, comprising:
a plurality of width strands;
a plurality of length strands which traverse the plurality of width strands;
an opening defined between two adjacent width strands and two adjacent length strands; and
an adhesive disposed on at least one side of the tape,
wherein at least one length strand has a cross-sectional area larger than one of the width strands,
wherein the plurality of length strands are arranged under the plurality of width strands such that the plurality of length strands are closer to a surface to which the dry wall tape is applied, and a tensile strength of the at least one length strand is sufficient for the at least one length strand to not break when the tape is pulled off of the surface and from underneath a joint compound that covered the tape and has cured.

22. The dry wall tape of claim 21, wherein the tensile strength of the least one length strand is greater than a tensile strength of the width strands and wherein the tape is configured to be applied to the panel system.

23. A removable joint tape for use with a panel system, comprising:
a plurality of width strands;
a plurality of length strands which traverse the plurality of width strands;
an opening defined between two adjacent width strands and two adjacent length strands; and
an adhesive disposed on at least one side of the tape,
wherein at least one length strand has a cross-sectional area larger than one of the width strands, and
a tensile strength of the at least one length strand is sufficient for the at least one length strand to not break when the tape is pulled off of the surface and from underneath a joint compound that covered the tape and has cured.

24. The removable joint tape of claim 23, wherein the tensile strength of the least one length strand is greater than a tensile strength of the width strands and wherein the tape is configured to be applied to the panel system.

\* \* \* \* \*